United States Patent [19]

Redlitz

[11] Patent Number: 5,682,240

[45] Date of Patent: Oct. 28, 1997

[54] INTERFEROMETRIC MEASUREMENTS WITH MULTIPLE LIGHT SOURCES

[75] Inventor: Kurt R. Redlitz, Cheshire, Conn.

[73] Assignee: Zygo Corporation, Middlefield, Conn.

[21] Appl. No.: 718,877

[22] Filed: Sep. 24, 1996

[51] Int. Cl.$^6$ .................................................. G01B 9/02
[52] U.S. Cl. ........................... 356/349; 356/345; 356/351
[58] Field of Search ..................................... 356/345, 349, 356/351

[56] References Cited

U.S. PATENT DOCUMENTS 4,688,940   8/1987   Sommargren et al. .
5,249,030   9/1993   Field et al. ..................... 356/349

OTHER PUBLICATIONS

N. Bobroff, "Recent Advances in Displacement Measuring Interferometry", pp. 907–926 (Measurement Science & Technology, vol. 4, No. 9, Sep. 1993).

Primary Examiner—Frank G. Font
Assistant Examiner—Robert Kim
Attorney, Agent, or Firm—Lawrence G. Kurland; Bryan Cave LLP

[57] ABSTRACT

A method and apparatus for synchronizing the measurements of at least two interferometers (40,41) using at least two light sources (20,22), respectively. Each light source (20,22) provides a single linearly polarized output beam (21,23). Acousto-optic devices (30,31) transform each input beam (21,23) into two orthogonally polarized beams (70,72) separated by a frequency difference determined by an oscillation source (10). The oscillation source (10) drives both acousto-optic devices (30,31) with separate amplifiers (12, 13) synchronizing both light sources. The two orthogonally polarized beam pairs (70,72) transverse the interferometers (40,41). The beams from the interferometers (71,73) return to the optical receivers (50,51). The optical receivers (50,51) mix the two return beam pairs (71,73) and send the resultant beat frequency (51,53) to the measurement electronics (60, 62). The measurement electronics (60,62) use the oscillation source signal (11) and the beat frequencies (51,53) to determine and accumulate the phase difference. The measurement electronics (60,62) output the accumulated phase difference (61,63).

12 Claims, 2 Drawing Sheets

INTERFEROMETRIC MEASUREMENTS WITH MULTIPLE LIGHT SOURCES

CROSS-REFERENCE TO RELATED APPLICATIONS

This application is related to the commonly owned copending United States patent applications entitled "Method and Apparatus For Providing Data Age Compensation In An Interferometer", filed Jun. 4, 1996 and bearing U.S. Ser. No. 08/658,088 still pending, and "Apparatus to Transform with High Efficiency A Single Frequency, Linearly Polarized Laser Beam Into Beams With Two Orthogonally Polarized Frequency Components", filed Jul. 26, 1996, and bearing U.S. Ser. No. 08/686,536. Still pending.

FIELD OF THE INVENTION

The present invention relates to apparatus for measuring the displacement of one or more moving stages. The invention relates in particular to interferometric apparatus using light beams to measure displacement of one or more moving stages using more than one light source.

BACKGROUND OF THE INVENTION

The use of interferometers to measure changes in position, length, distance, angles, and optical length is well known, see for example, "Recent advances in displacement measuring interferometry" N. Bobroff, *Measurement Science & Technology*, pp. 907-926, Vol. 4, No. 9, September 1993 and commonly owned U.S. Pat. No. 4,688,940 by Sommargren and Schaham issued Aug. 25, 1987. Rapidly increasing demands and needs for higher accuracy determinations of the precise time at which multiple interferometric position measurements are taken have fueled numerous efforts to reduce and minimize the various sources of uncertainty that are inherent in currently known methods and apparatus. For many current applications, e.g. in the step-and-repeat and dynamic writing photolithography tools used to manufacture integrated circuits, many axes must be measured interferometrically on one or more stages so that all position measurements represent known instants of time. The optical power and timing precision requirements of these systems exceed the capabilities of current interferometer light sources.

There is an unmet need for multiple synchronized light sources for making interferometric distance or position measurements to be made with substantially reduced data age differences.

SUMMARY OF THE INVENTION

The present invention provides a method and apparatus for synchronizing the measurements of at least two interferometers using at least two light sources, respectively. Each light source provides an output beam which is comprised of two orthogonal polarizations separated by a frequency difference. The invention comprises means, preferably a stabilized electronic oscillator, for establishing a first fixed frequency; means for causing the frequency difference between the two orthogonal polarizations from the first light source to be tied to the first fixed frequency; means, either electrical or optical, for transmitting a second fixed frequency tied to the first fixed frequency from the first light source to the second light source; and means for causing the frequency difference between the two orthogonal polarizations from the second light source to be tied to the first fixed frequency.

DETAILED DESCRIPTION OF THE INVENTION

The present invention is directed to an apparatus, preferably an interferometer system and most preferably a heterodyne interferometer system, which is operated for simultaneously measuring, for multiple measurement axes, at each sampling or measurement instant, with great accuracy and heretofore-unattained uncertainty, both relative changes in position, as for example length or optical length, and the relative time when each sample or position measurement is taken.

While the apparatus has application for a wide range of radiation sources, the following description is taken by way of example with respect to an optical measuring system. The term "radiant energy" as used herein includes, but is not limited to electromagnetic energy of all frequency ranges.

Figure 1:
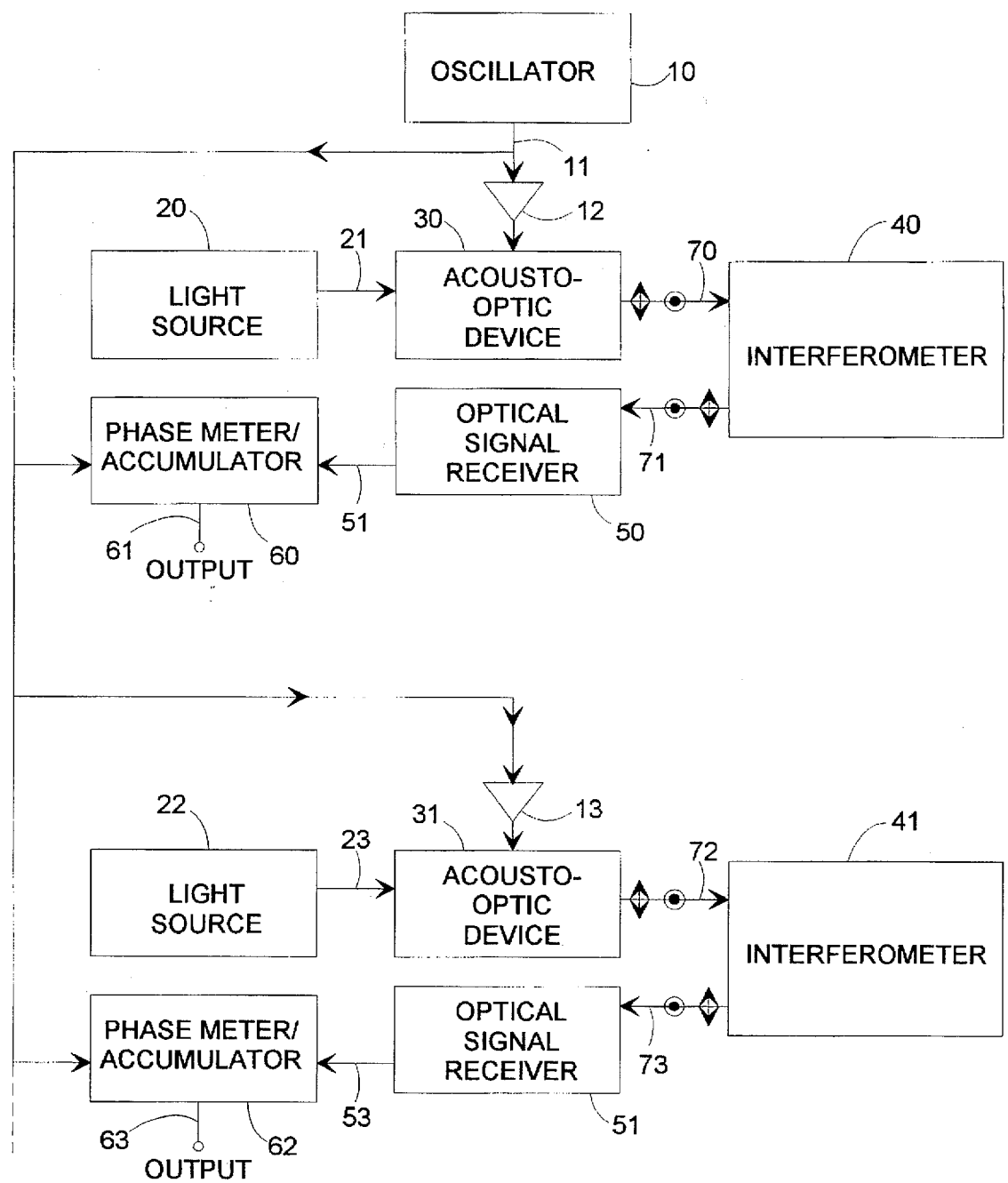
FIG. 1 depicts in schematic form a preferred embodiment of the present invention.

As shown and preferred in FIG. 1, the apparatus of the present invention comprises a pair of light sources (20,22). Each light source (20,22) preferably provides a single linearly polarized output beam (21,23). Acousto-optic devices (30,31) preferably transform each input beam (21,23) into two orthogonally polarized beams (70,72) separated by a predetermined frequency difference such as, by way of example, 20 MHz, as determined by an oscillation source (10), such as a 40 MHz oscillation source in the above example. The present invention is not limited to these frequencies given by way of example and may vary. The oscillation source (10) preferably drives both acousto-optic devices (30,31) with separate amplifiers (12,13) synchronizing both light sources. The two orthogonally polarized beam pairs (70,72) transverse the interferometers (40,41). The beams from the interferometers (71,73) preferably return to a pair of optical receivers (50,51). The optical receivers (50,51) preferably mix the two return beam pairs (71,73) and send the resultant beat frequency (51,53) to the measurement electronics (60,62). The measurement electronics (60,62) preferably use the oscillation source signal (11) and the beat frequencies (51,53) to determine and accumulate the phase difference with the measurement electronics (60,62) outputting the accumulated phase difference (61,63).

Figure 2:
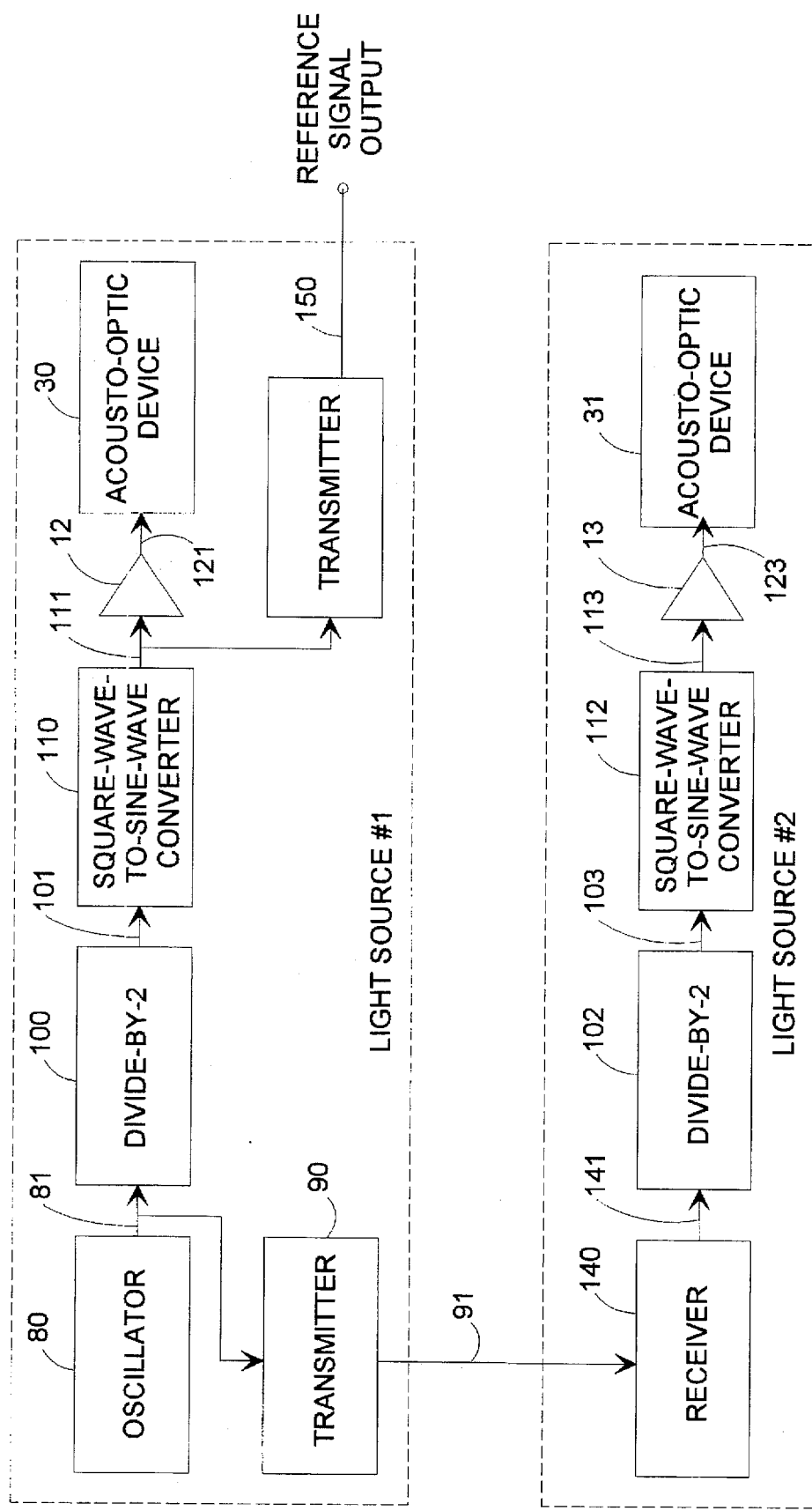
FIG. 2 depicts in schematic form the transmission and connection of the synchronizing frequency source used in the embodiment of FIG. 1.

FIG. 2 depicts the oscillator (80) signal (81) used in the first light source (20) to drive the acousto-optic device (30) in the first light source (20) and transmitted (90,91) to and received (140) by the second light source (22). A fiber optic cable (91) is the preferred transmission media, however, the present invention is not limited to this transmission media and includes transmission by other means such as electrical transmission over conductors, via radio frequency modulation, via radio amplitude modulation and optical transmission.

In the above example, preferably both 40 MHz signals (81,141) are divided by 2 (100,102) to produce symmetrical 20 MHz square waves (101,103). Wave shaping electronics (110,112) preferably convert the square waves into sine waves (111,113). A power amplifier (12,13) in each light source preferably drives the acousto-optic devices (30,31) with the 20 MHz sine waves (121,123) in this example. The acousto-optic device (30,31) preferably creates the two linearly polarized beam components for the preferred interferometer system depicted in FIG. 1.

The reference signal output (150) which is preferably provided to the measurement electronics (60,62) is preferably derived from the 20 MHz sine wave (111) in the above example.

While the invention has been described with reference to particular embodiments thereof, those skilled in the art will be able to make the various modifications to the described embodiments of the invention without departing from the true spirit and scope of the present invention. It is intended that all combinations of elements and steps which perform substantially the same function in substantially the same way to achieve the same result are within the scope of the invention.

I claim:

1. A system for providing interferometric measurements using multiple synchronized light sources, said system comprising first and second interferometer means;
   a first light source associated with said first interferometer means, and a second light source associated with said second interferometers means, each of said first and second light sources comprising means for providing an output beam comprised of a pair of orthogonal polarizations separated by a frequency difference, each of said pair of orthogonal polarizations beams transversing said associated interferometers means;
   means for establishing a first fixed frequency;
   means for causing said frequency difference between said pair of orthogonal polarizations from said first light source to be tied to said first fixed frequency;
   means for transmitting a second fixed frequency tied to said first fixed frequency from said first light source to said second light source; and means for causing said frequency difference between said pair of orthogonal polarizations from said second light source to be tied to said first fixed frequency; whereby the measurement of said interferometers using multiple light sources may be synchronized for enabling said interferometric measurements to be made with reduced data age differences.

2. A system in accordance with claim 1 wherein said means for establishing said first fixed frequency comprises a stabilized electronic oscillator means.

3. A system in accordance with claim 1 wherein said means for transmitting said second fixed frequency from said first light source to said second light source comprises optical means.

4. A system in accordance with claim 1 wherein each of said light sources comprise a source of a single linearly polarized output beam and an acousto-optic means for transforming said single linearly polarized output beam into said pair of orthogonally polarized beams separated by said frequency difference.

5. A system in accordance with claim 4 wherein said frequency difference substantially comprises 20 MHz.

6. A system in accordance with claim 1 wherein said means for transmitting said second fixed frequency from said first light source to said second light source comprises electrical means.

7. A system in accordance with claim 4 further comprising an oscillation source operatively connected to said acousto-optic means, said frequency difference being determined by said oscillation source.

8. A system in accordance with claim 7 wherein said oscillation source frequency substantially comprises twice said frequency difference.

9. A system in accordance with claim 8 wherein said frequency difference substantially comprises 20 MHz.

10. A system in accordance with claim 1 wherein said frequency difference substantially comprises 20 MHz.

11. A system in accordance with claim 1 wherein said interferometer system comprises a heterodyne interferometer system operable for simultaneously measuring relative changes in position and time of measurement for multiple measurement axes.

12. A system in accordance with claim 3 wherein said optical means comprise fiber optic means.

* * * * *